Nov. 19, 1963  F. T. MEI  3,111,273

SOAKER AND SPRAY NOZZLE

Filed Feb. 5, 1962

*INVENTOR.*
FRANK T. MEI
BY
ATTORNEY

United States Patent Office 3,111,273
Patented Nov. 19, 1963

3,111,273
SOAKER AND SPRAY NOZZLE
Frank T. Mei, 6739 Devonshire Drive, San Jose, Calif.
Filed Feb. 5, 1962, Ser. No. 171,196
3 Claims. (Cl. 239—447)

My invention relates to nozzles, and more particularly, to garden hose nozzles which are useful as both a soaker and a spray nozzle.

Previous garden hose nozzles have been designed to spray water in a desired pattern. The flow of water from these nozzles is always quite directional and will always hydraulically erode the earth when allowed to lie on the ground.

This defect in prior art nozzles has substantially prevented their use as a soaker for shrubs, etc. If the user desires to soak topsoil having no ground cover, he must remove the nozzle from the hose. If he then desires to spray another section of land, he must turn the water off in order to replace the nozzle on the hose.

It is an object of this invention to provide a nozzle for garden hoses which can be conveniently and accurately adjusted to direct a spray of varying spread and character or to provide an essentially non-directional flow of water for soaking purposes.

It is also an object of this invention to provide a nozzle wherein the flow of water can be adjusted from that of a spray to a non-directional flow without cutting off the flow of water to the nozzle.

Other advantages of this invention will become apparent from the following detailed description and the accompanying drawings in which.

Figure 1:
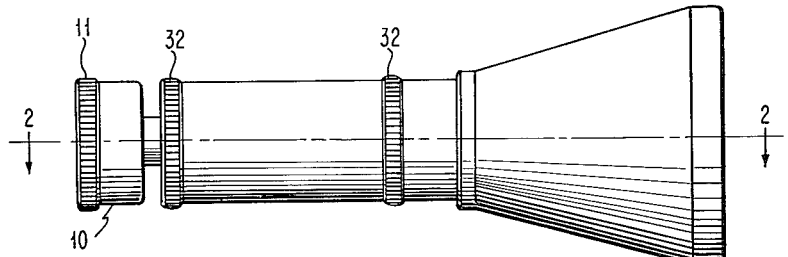
FIG. 1 is a side elevation of a hose nozzle comprising one specific embodiment of the invention.
Figure 2:
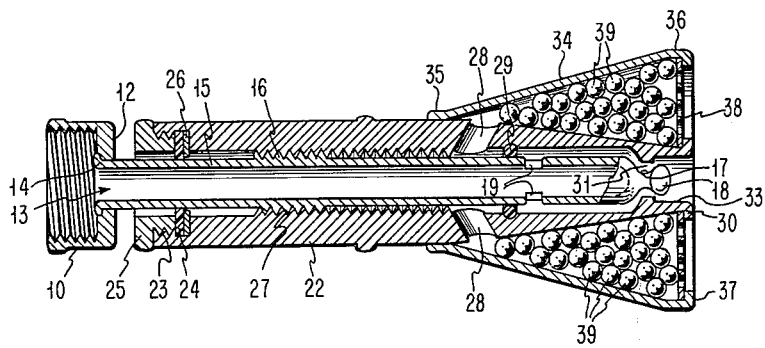
FIG. 2 is a cross-sectional view taken on line 2—2 of FIG. 1.

The nozzle depicted in FIGS. 1 and 2 has a cylindrical base 10 which is externally provided with annular knurled ribs 11 and threaded internally to form a socket adapted to be screwed upon the usual screw coupling of a garden hose. The anterior wall 12 of base 10 has a central outwardly beveled opening 13 in which flange 14, on the posterior end of hollow stem 15, is tightly connected. Anterior to flange 14 on stem 15 is externally threaded section 16. The anterior end of stem 15 is solid and is formed with an annular recess 17 adjacent head 18. To the rear of recess 17 in hollow stem 15 are lateral orifices 19.

External to stem 15 is cylindrical barrel member 22 which is hollow provided, at one end, with an internal annular recessed threaded section 23 adapted to secure packing gland 24 in conjunction with follower 25 and retaining washer 26. Member 22 has an internal threaded section 27 adapted to engage threaded section 16 to permit relative axial adjustment between stem 15 and member 22 in response to rotation of one of elements 15 and 22 with respect to each other. Lateral orifices 28 are provided in member 22 anterior to threaded section 27. Adjacent orifices 28, is an annular recess adapted to retain an O-ring type packing gland 29. The anterior end of member 22 is frusto conical and has, at its outer anterior end, circumferentially spaced lugs 30 and centrally spaced orifice 31 separated by internal curved section 33. Member 22 is provided with external knurled ribs 32 to facilitate adjustment of the water spray pattern.

Frusto conical soaker member 34 is connected to member 22 in a water tight joint by cylindrical flange 35. Member 34 terminates, on its anterior end, in a second cylindrical flange 36 which, by means of circumferentially spaced lugs 37 on its inner surface and lugs 29 on member 22, acts as a retaining means for perforated plate 38 which is adapted to be screwed into place under outwardly projecting lugs 30 and inwardly projecting lugs 37. Spheres 39 act as baffles to the flow of water.

In the operation of the nozzle as depicted in FIG. 2, the water flows from the hose through stem 15, orifices 19 and out orifice 31. When stem 15 is retracted from member 22, orifices 19 more rearwardly past gland 29 and the flow of water is directed out orifices 28, through spheres 39 and plate 38 in an essentially non-directional flow.

Figure 3:
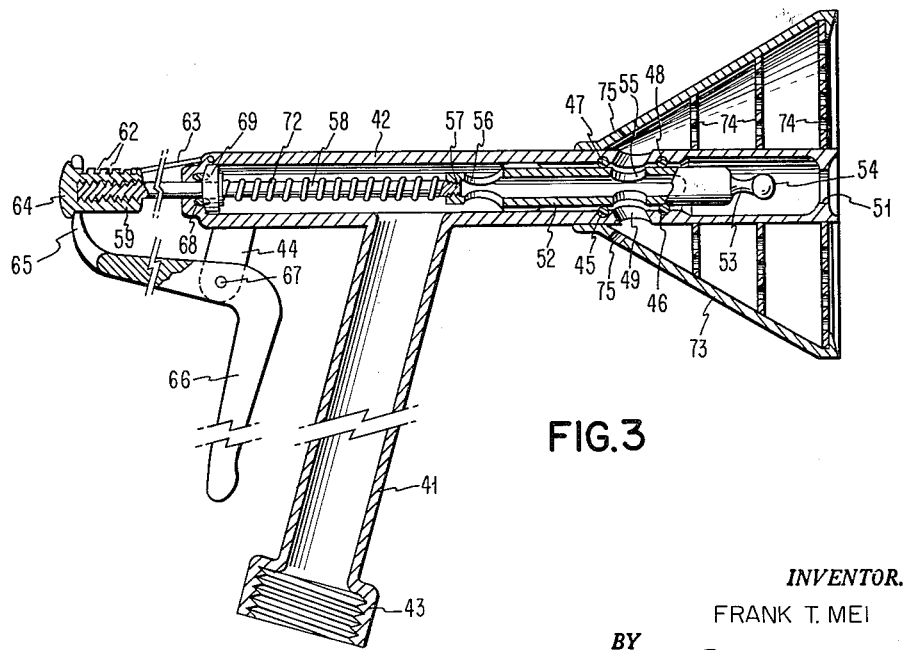
FIG. 3 is a cross-sectional view of a different embodiment of the invention of the pistol grip type.

The pistol grip nozzle of FIG. 3 has a unitary handle 41 and hollow cylindrical barrel 42. The lower end of handle 41 is an internally threaded socket 43 adapted to be screwed into the usual threaded hose coupling. The rear end of barrel 42 is of reduced diameter and is attached, on its lower side, to control arm support member 44. Anterior to handle 41 within barrel 42 are annular recesses 45 and 46 adapted to seat annular packing glands 47 and 48. Between recesses 45 and 46 are lateral orifices 49. Barrel 42 is inwardly arcuately beveled at its anterior end, the bevel terminating in an annular, internally projecting flange 51.

Positioned within barrel 42 is hollow valve stem 52 which, at its anterior end is solid. Annular recess 53 and head 54 are cut into the solid portion of stem 52. Rearwardly positioned are orifices 55 and 56. Stem 52 is interiorly threaded at its posterior end and is adapted to receive threaded section 57 of control rod 58. Screwed onto threaded section 57 at the rear of rod 58 is nut 59. Nut 59 has a series of annular recesses 62 cut along its length adapted to co-act with square bail 63 to maintain valve stem 52 in a desired position. Bail 63 terminates within recesses in the outer wall of barrel 42. Nut 59 has an enlarged head 64 which acts as a retaining means for a notch 65 cut into the upper portion of control arm 66. Control arm 66 is adapted to rotate around retaining pin 67 connecting arm 66 and support member 44.

Annular seal 68, spring seat 69 and spring 72 are positioned around control rod 58 within barrel 42. Spring seat 69 has an internal annular recess into which a portion of seal 68 fits. The other end of seal 68 fits into an annular recess in the reduced diameter portion of barrel 42.

A frusto conical soaker member 73 like that of FIGS. 1 and 2 is attached to the forward portion of barrel 42. A series of baffle plates 74 are fixed between the outer wall of barrel 42 and member 73. At the rear of member 73 are circumferentially spaced openings 75 which serve as air inlets.

The nozzle is operated by squeezing control arm 66 so as to retract valve stem 52 to a desired position. If valve stem 52 is allowed to move completely forward at the urging of spring 72, stem 52 will rest against flange 51 and prevent the flow of water from the nozzle. If stem 52 is partially retracted, water coming into the stem 52 from barrel 42 through orifice 56 issues from orifice 55 and is sprayed from the opening between head 54 and flange 51. If the stem is fully retracted, as depicted, water entering the stem 52 leaves the stem through orifice 55, flows through orifice 49, baffle plates 74 and out of the nozzle in a gentle flow. Air aspirated through openings 75 mixes with the out-flowing water and serves to reduce the directional force of the water.

It is not intended that my invention be limited to the exact embodiments shown; rather, it is intended that all equivalents obvious to those skilled in the art be included within the scope of my invention.

Now, having described my invention, what I claim is:
1. A nozzle comprising:
   an inner tubular member having:
      one end adapted to be connected to a fluid outlet;

a valve portion adjacent the opposite end of said tubular member; and a perforated area intermediate the ends of said tubular member;

an outer cylinder member having:

a valve seat portion intermediate the ends of said cylinder member;

an orifice area intermediate the ends of said cylinder member; and a substantially fixed fluid seal intermediate said orifice area and said valve seat portion of said cylinder member; and a soaker member connected to receive a fluid from the orifice area of said cylinder member and to discharge said fluid in an essentially non-directional flow, the outer cylinder member being axially adjustable to:

move said valve portion and said valve seat portion with respect to the other, thereby regulating the flow of fluid therebetween; and to position the perforated area of said tubular member and the orifice area of said cylinder member on the same side of said fixed seal, thereby allowing diverting the fluid flow to said soaker member.

2. A pistol-grip type nozzle for delivering a fluid control spray in an essentially non-directional flow comprising:

an inner tubular member having:

first and second perforated portions; and a valve portion adjacent one end of said tubular member;

an outer barrel member:

positioned concentrically around said tubular member;

adapted to be connected to a fluid source;

having a transversely apertured partition intermediate the ends thereof; and positioned more intermediately of said partition an orifice area;

fluid seal members positioned on both sides of said orifice area;

a soaker member connected to receive a fluid from the orifice area of said barrel and discharge said fluid in an essentially non-directional flow; and positioning means effectively connected to position said tubular member within said barrel to thereby regulate the flow of fluid entering said first perforated portion and exiting said second perforated portion between said valve portion and said valve seat portion and to divert the fluid flow to said soaker member between said fluid seal members through said orifice area.

3. A garden hose nozzle having a posterior end adapted to be attached to a garden hose and an anterior end adapted to pass water therethrough in a controlled directional spray pattern and in a nondirectional flow comprising: a soaker member, a hollow cylindrical barrel member, a hollow tubular member, and packing means; the soaker member being attached, at its posterior end, to the intermediate portion of the barrel member and having its anterior end adapted for passage of water in an essentially nondirectional flow; the barrel member having at least one perforation anterior to the connection to the posterior end of the soaker member and adapted to form an internal valve seat at its anterior end; the tubular member being adapted to be advanced anteriorly and retracted posteriorly within said barrel, perforated to allow the flow of water therethrough, and closed at its anterior end to form a valve head adapted to control and direct a flow of water passing between said valve head and said internal valve seat to form a controlled spray; and packing means being adapted to provide a water seal between the barrel member and the tubular member, and positioned medially of the barrel member causing water to flow anteriorly into said barrel member on advancement of the tubular member anterior to the packing and through the perforated barrel member into the soaker member when retracted.

References Cited in the file of this patent

UNITED STATES PATENTS

| | | |
|---|---|---|
| 592,447 | Richardson | Oct. 26, 1897 |
| 618,412 | Haas et al. | Jan. 31, 1899 |
| 2,333,767 | Davis | Nov. 9, 1943 |
| 2,538,211 | Prout | Jan. 16, 1951 |
| 2,651,546 | Palm | Sept. 8, 1953 |
| 2,842,429 | Easton et al. | July 8, 1958 |
| 2,887,275 | Dixon et al. | May 19, 1959 |
| 3,001,723 | Bounds | Sept. 26, 1961 |
| 3,037,710 | Kusznier | June 5, 1962 |